United States Patent [19]

Braun et al.

[11] Patent Number: 5,667,108
[45] Date of Patent: Sep. 16, 1997

[54] SINGLE VALVE DISPENSING BALANCE

[75] Inventors: Thomas Braun, Schwaebisch Hall; Werner Gwinner, Rosenqarten, both of Germany

[73] Assignee: OPTIMA-Maschinenfabrik Dr. Bühler GmbH & Co., Germany

[21] Appl. No.: 422,505

[22] Filed: Apr. 13, 1995

[30] Foreign Application Priority Data

Apr. 13, 1994 [DE] Germany .................. 44 12 660.3

[51] Int. Cl.⁶ .................................................. B65D 47/00
[52] U.S. Cl. .................... 222/181.1; 222/195; 222/196; 222/504; 222/547; 222/560
[58] Field of Search ..................... 222/181.1, 195, 222/196, 198, 202, 482, 484, 485, 504, 542, 547, 548, 560, 564

[56] References Cited

U.S. PATENT DOCUMENTS

| | | | |
|---|---|---|---|
| 3,097,711 | 7/1963 | Clark | 222/505 X |
| 3,371,826 | 3/1968 | Speno | 222/504 X |
| 3,408,876 | 11/1968 | Andrews | 222/202 X |
| 3,720,286 | 3/1973 | Clark . | |
| 3,907,178 | 9/1975 | Armstrong | 222/504 |
| 4,039,062 | 8/1977 | Carre et al. | 222/547 X |
| 4,466,558 | 8/1984 | Dugge et al. | 222/195 |
| 4,705,125 | 11/1987 | Yamada et al. . | |
| 4,766,966 | 8/1988 | Nagao et al. . | |
| 5,411,174 | 5/1995 | Braun et al. | 222/504.4 |

FOREIGN PATENT DOCUMENTS

| | | |
|---|---|---|
| 1000561 | 2/1989 | Belgium . |
| 223088 | 5/1987 | European Pat. Off. . |
| 268346 | 5/1988 | European Pat. Off. . |
| 348592 | 1/1990 | European Pat. Off. . |
| 488318 | 3/1992 | European Pat. Off. . |
| 555765 | 8/1993 | European Pat. Off. . |
| 616741 | 8/1935 | Germany . |
| 1063396 | 8/1959 | Germany . |
| 1892814 | 5/1964 | Germany . |
| 1948182 | 8/1966 | Germany . |
| 1908739 | 3/1970 | Germany . |
| 2656007 | 6/1978 | Germany . |
| 3138796 | 4/1983 | Germany . |
| 3536347 | 10/1986 | Germany . |
| 3822208 | 4/1990 | Germany . |
| 4203883 | 12/1993 | Germany . |
| 506763 | 5/1976 | U.S.S.R. . |
| 535464 | 11/1976 | U.S.S.R. . |
| 576066 | 5/1977 | U.S.S.R. . |
| 645621 | 1/1979 | U.S.S.R. . |
| 1599661 | 10/1990 | U.S.S.R. . |
| 1327112 | 8/1970 | United Kingdom . |
| 1463146 | 2/1977 | United Kingdom . |
| 2188740 | 10/1987 | United Kingdom . |

*Primary Examiner*—Andres Kashnikow
*Assistant Examiner*—Kenneth Domberg
*Attorney, Agent, or Firm*—Quarles & Brady

[57] ABSTRACT

An apparatus for dosing volumes and/or weights of a free-flowing product contains a shaft formed by four fixed walls. At the lower end of the shaft is provided a rotary flap or valve, which can be closed and opened by a motor drive. Rotation takes place about an axis located in the vicinity of the rear wall of the shaft. The rotary valve can be opened to randomly selectable opening positions and fixed there.

26 Claims, 2 Drawing Sheets

SINGLE VALVE DISPENSING BALANCE

The invention relates to an apparatus for supplying measured doses, by volume and/or by weight of a free-flowing material. Examples for such an apparatus are constituted by filling balances.

In the case of the filling balances presently on the market a product flow is set with the aid of an adjustable slide valve and is dependent inter alia on the material to be filled. Product portions having a specific weight or volume, according to the set product flow, are then produced by means of a shut-off valve portions.

In DE A1 35 36 347, for example, linear slide valves are used for setting the product flow.

A filling balance is also known DE-A1-42 03 883, which uses a rotary slide valve for setting the product flow.

An apparatus is also known for setting the passage cross-sections for a main and a fine flow on inlets for balances (German utility model 19 48 182). At the lower end of the shaft is located a rotary valve or flap, which can be pivoted between an open position and a closed position, both positions being defined by adjustable stops.

The object of the invention is to provide an apparatus of the aforementioned type which, in the case of a simple construction, permits an accurate and rapid dosing for different materials and varying weights and/or volumes.

Unlike the weighing devices at present on the market, there is no need in the case of the apparatus according to the invention to set the product layer thickness. It makes use of a single rotary valve, whose different positions can be set for the material to be handled or for the quantities to be measured. Through making no use of a slide valve for setting the layer thickness, the constructional expenditure for the apparatus is reduced. It has surprisingly been found that despite the simplified construction the object of the invention can still be. The different possible positions of the rotary valve are determined by suitable remote indicating devices or by the corresponding construction of the control of the rotary valve by the drive. There is no need for adjustable mechanical stops for setting the different positions. End stops can be provided for defining the maximum possible pivotability of the rotary valve. In particular the front wall of the shaft facing the rear wall need not be provided with an adjustable construction Within the sense of the present application, the term rear wall means that shaft wall on which the product flow forms and towards which the rotary valve moves on passing into the closed position. For example, the rear wall is inclined slightly with respect to the vertical, e.g. by an angle of approximately 30°.

According to the invention the rotary valve or flap can have an open position corresponding to the coarse flow position.

During a conventional dosing process the valve is initially opened to the coarse flow position until a given quantity of the material to be handled has flown through. This quantity can be established by the weighing mechanism Subsequently the drive moves the rotary valve into a second open position, corresponding to a fine flow position. In this case the material flows until the desired quantity or weight is detected by the weighing mechanism, and then the valve is completely closed.

If the weighing mechanism establishes that the desired quantity or weight has not yet been reached, the rotary valve can be opened again to a certain extent, namely in an afterdosing or after-proportioning position according to the invention. The after-dosing position is adjustable as a function of the product and is between the closed position and the fine dosing position.

In the case of very considerable weights or volumes, according to the invention, the rotary valve at the start of the dosing process is moved into a preportioning position, which represents an even greater opening of the rotary valve than the coarse opening.

According to the invention the apparatus can have a fine dosing device, which can e.g. be implemented by a specific position of the rotary valve with a small opening cross-section.

It can in particular be provided that the leading edge of the rotary valve has a recess diverging from a straight line. As a result, the opening cross-section of the rotary valve can be accurately defined in the fine dosing position. For example, the recess can have a step shape, so that in the fine flow position only a small part of the rotary valve has an opening in the longitudinal direction. It is also possible to provide the recess with a cross-sectional shape which continuously decreases from the leading edge, e.g. a triangular shape. This allows an even more accurate fine portioning to be carried out.

According to the invention the shaft is subdivided by a partition at least in the vicinity of the rear wall. This subdivision can form part of the fine dosing device.

It can in particular be provided that the partition extends at least up to the end of the recess in the leading edge of the rotary valve in the fine flow position thereof. As a result it is possible to ensure that in the fine dosing position the material only flows out through the remaining opening from part of the shaft. This more particularly applies if the partition passes from the rear wall to the front wall of the shaft.

The invention proposes that the recess in the front wall of the rotary valve is located completely on one side of the partition.

It can in particular be provided that the length of the recess in the direction of the leading edge corresponds to the distance between the partition and the side wall of the shaft.

The recess forming part of the fine dosing device can be positioned at a random point of the leading edge of the shut-off valve. It can e.g. be located at one end of the leading edge, so that the afterdosing takes place on the weighting device located below the dosing device at a specific lateral point.

According to a further development of the invention, projections, pins, etc. can be located on the inside of the rotary valve and, during the movement of the latter, can loosen material resting on its inside.

According to a further development of the invention the apparatus can also have a vibrating device. The latter can e.g. be formed such that the rotary valve undergoes short, rapid vibrations with limited deflection by its drive, e.g. in the completely closed or completely open position of the rotary valve. This vibrating device prevents the formation of bridges in the material to be handled According to the invention, a guide plate can be provided on the front wall of the shaft. The guide plate is optionally movable together with the rotary valve, e.g. in that it is connected thereto by means of a drag lever or the like. This also permits a certain influence on the product flow.

The apparatus can, according to the invention, have a reference point determination device, e.g. in that the drive moves the rotary valve against a stop and the reaching of the stop is e.g. detected by a switch or a sensor means. It is also possible to detect reaching the stop by the power consumption of the motor increasing.

For improving or assisting the product flow it is possible according to the invention to provide a fluidizing device, which e.g. blows compressed air or a compressed gas into the shaft and preferably at a limited distance above the rear wall of the shaft. This device can also carry out a protective gassing or fumigation of the product. It is possible for this purpose to have several nozzles directing the gas out in a direction parallel to the flow direction and to the plane of the rear wall.

The drive for the rotary valve can in particular be formed by a servomotor and/or a stepping motor.

According to the invention the rotary valve can engage below the rear wall of the shaft, i.e. does not engage in flush manner on the rear wall.

During the filling of granular products, e.g. seed or grain, it may be desirable to perform the dosing in such a way that individual seeds or grains are not cut during the closing of the rotary valve or flap For this purpose, the invention provides for an elastically resilient construction of the lower edge of the rear wall, which can in particular be brought about in that the lower edge has a rubber elastic lip. Then, on closing the rotary valve, any individual grain is secured by the sealing lip. Thus, there is neither a crushing, nor a splitting of the individual grain.

During the filling of products the problem can arise of the product being subject to bulk density fluctuations or density changes. This is a function of the production process. A change in the bulk density modifies the degree of filling of the pack in the case of a constant filling weight. In order to be able to detect such a change in the bulk density and initiate counter-measures, according to the invention the apparatus can have a device for delivering a clearly defined volume, for which in particular the fine dosing device can be used. Such a defined volume delivery device can e.g. be constructed in such a way that with the rotary flap closed and the shaft filled, an additional slide valve is slid into the shaft in such a way that it is not then possible for a subsequent sliding into the so defined space. Then, by opening the rotary valve, the filled content of this volume can be delivered to the balance and weighed there. Such a device can be controlled by a control system on the apparatus.

Figure 1:
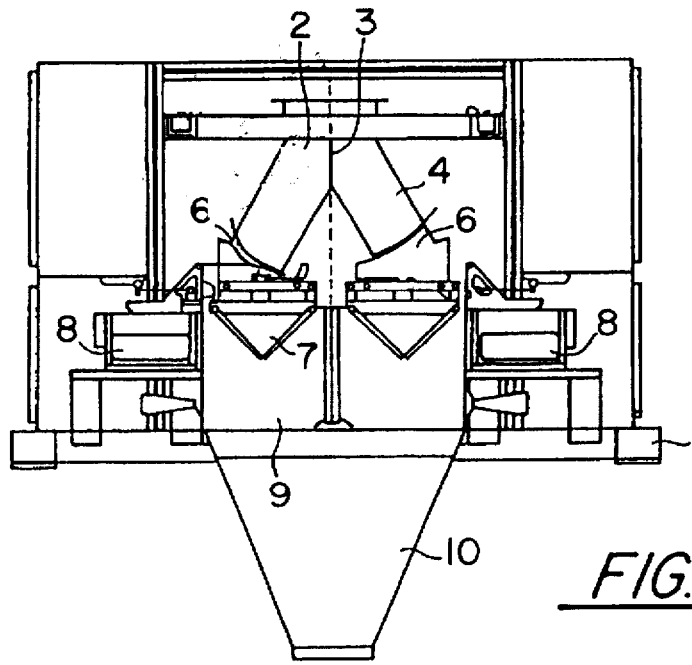
FIG. 1 is a diagrammatic overall view of a filling balance.

FIG. 1 diagrammatically shows in a general arrangement drawing a filling balance with a machine frame 1 to which are fitted the different components. The product to be weighed and filled is supplied by means of a supply shaft 2, which is centrally subdivided by a partition 3. It leads to two dosing devices 4, in which is in each case located a shut-off valve or flap 6 in the form of a rotary valve or flap for interrupting the product flow. Below the rotary flap 6 is provided the left-hand load pan 7 for the weighing device 8. The weighed product is then supplied via a discharge box 9 into a discharge hopper or funnel 10, from where it drops into the pack.

Figures 2, 4:
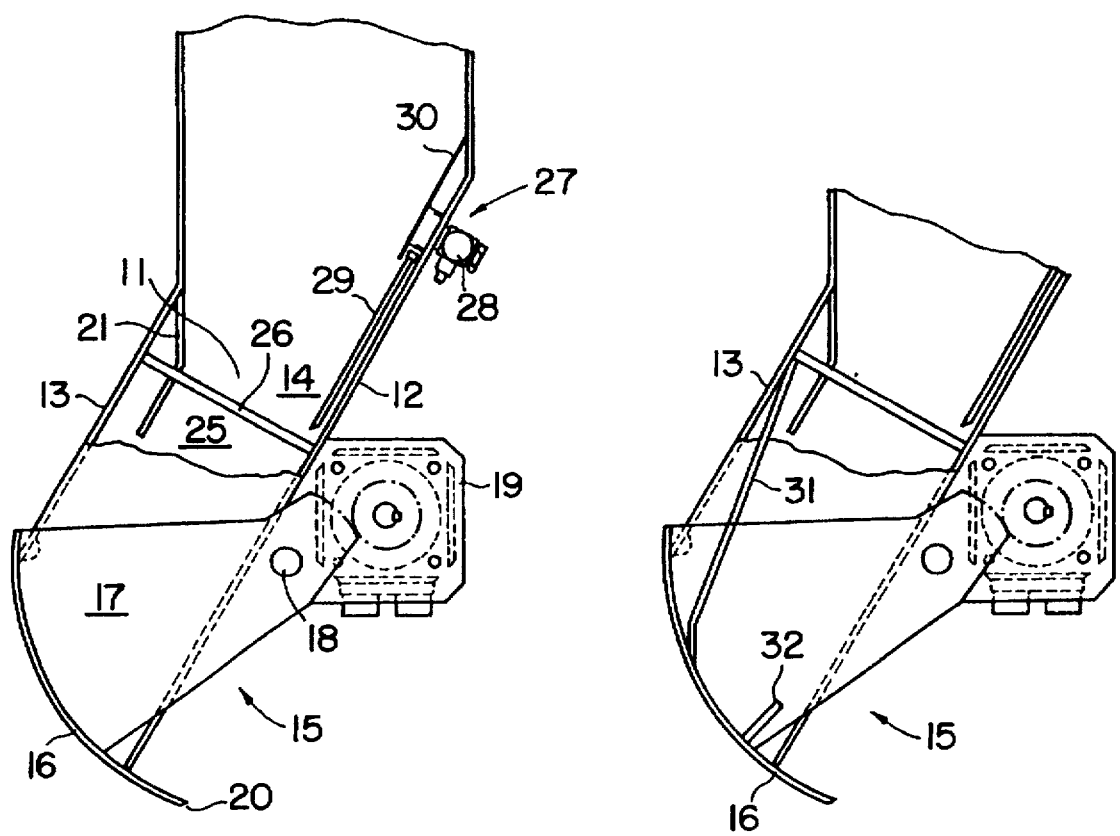
FIG. 2 is a diagrammatic a cross-section through a shaft belonging to the filling balance with a shut-off device in the form of a rotary flap or valve.
FIG. 4 is a partial view corresponding to FIG. 2 with an inserted guide plate.

FIG. 2 shows on a larger scale details of the dosing devices 4. The dosing device contains a shaft 11, which is shown in section in FIG. 2. The shaft 11 contains a planar rear wall 12, which is inclined somewhat relative to the vertical. Opposite the rear wall 12 the front wall 13 is positioned substantially parallel to the rear wall 12, so that together with the side walls 14 a shaft 11 with a rectangular cross-section is obtained.

On the underside of the shaft 11 is provided as a shut-off valve or flap a rotary valve or flap 15. The rotary valve 15 contains, in the illustrated embodiment, a sealing plate 16, which is shaped like a circular cylindrical envelope. On the end faces of the sealing plate 16 are provided circular sector-like side parts 17, which are positioned roughly vertically on the sealing plate 16 and form a lateral boundary of the rotary valve 15. The side parts 17 are mounted directly behind the rear wall 12 on a shaft 18, which forms a rotation axis running parallel to the rear wall 12 of the shaft 11.

A motor drive 19, for example a servomotor, is mounted to the rear wall 12 of the shaft 11 by a flange. The servomotor 19 is kinematically connected to the side parts 17 of the rotary valve and the latter can rotate about the rotation axis of the shaft 18. In the position shown in FIG. 2, the rotary valve 15 is in its closed or sealed position, in which the leading edge 20 of the sealing plate 16 is pivoted under the lower edge of the rear wall 12. Both the rear wall 12 and the front wall 13 of the shaft 11 extend precisely up to the inside of the sealing plate 16, so that a seal is obtained against any outflow of the material to be handled. The side walls 14 also extend up to the inside of the sealing plate 16.

In the vicinity of the intake into the shaft 11, facing the rear wall 12, there is a guide plate 21 which is at a certain distance in front of the front wall 13, and following a short parallel path, ends in an edge.

The product to be weighed passes into the interior of the shaft 11 and rests on the inside of the sealing plate 16. If the product is now to be delivered into the underlying weighing device 8, the servomotor 19 is started up and pivots the rotary flap 15 clockwise. Therefore, the leading edge 20 of the sealing plate 16 passes onto the left side of the rear wall 12 in FIG. 2, so that at this point a gap is formed through which the material to be weighed can pass into the left-hand pan 7.

Figure 3:
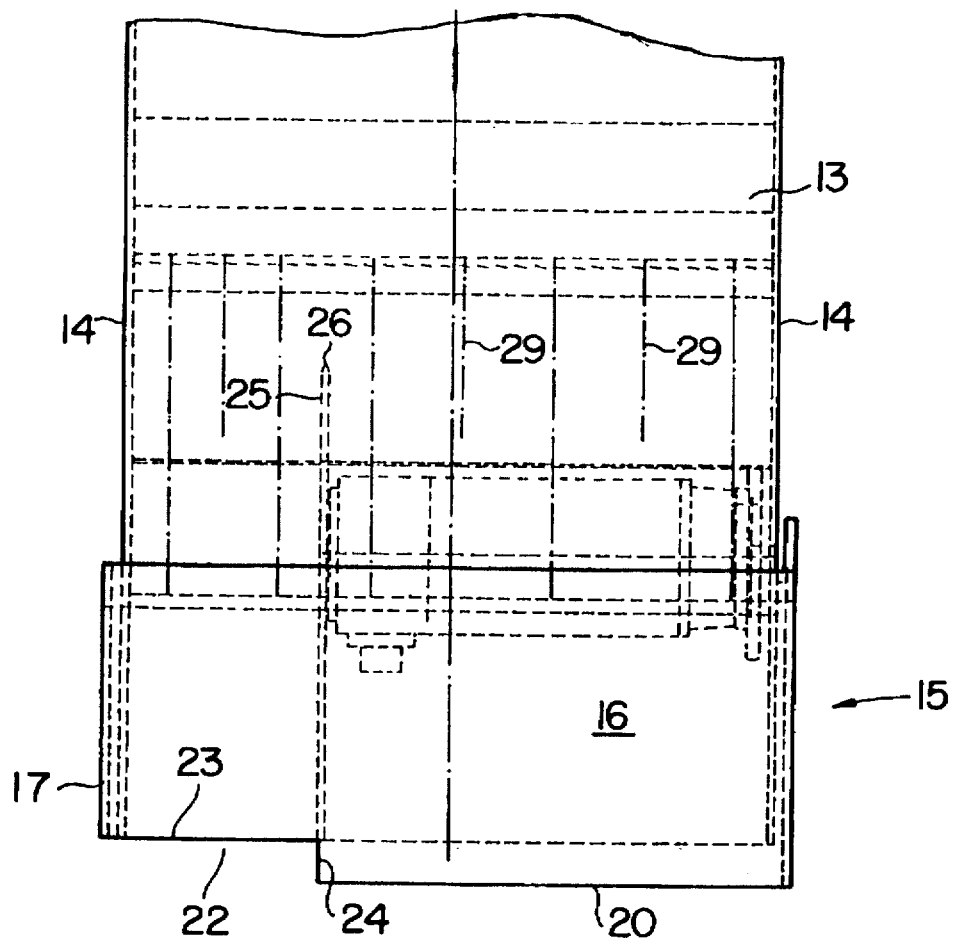
FIG. 3 is a view of the shaft of FIG. 2 from the left.

FIG. 3 shows a side view of the arrangement from the left in FIG. 2. As can be gathered from FIG. 3, the sealing plate 16 of the rotary valve 15 contains in its leading edge 20, cf. FIG. 2, a recess 22. The recess has a step-like construction and extends from one end of the leading edge, i.e. from the side part 17, over a smaller part of the length of the leading edge 20. The recess is bounded by a longitudinal edge 23 running parallel to the leading edge and a lateral edge 24, which is perpendicular to the leading edge in the illustrated embodiment. The recess 22 could also be located at a different point starting from the leading edge 20 of the sealing plate 16, e.g. in the centre. It could also have a shape differing from the step shape shown.

Figure 5:
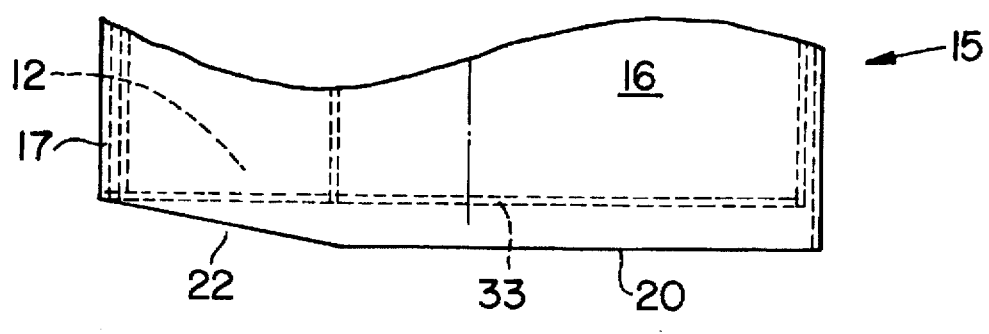
FIG. 5 is a partial view of FIG. 3, showing alternative embodiments.

The cross-sectional shape can continuously decrease from the leading edge 20, for example, as a triangle as shown in FIG. 5, or as a trapezoid.

In the shaft 11 a partition 25 extends between the rear wall 12 and the front wall 13. The upper edge 26 of the partition 25 can be seen in both FIGS. 3 and 2. The partition subdivides the shaft into two halves, whereof the smaller half is located at the same point of the shaft as the recess 22 in the leading edge 20 of the sealing plate 16. Thus, the partition together with the recess 22 forms a fine dosing device, whose significance will be explained hereinafter.

The servomotor 19 initially pivots the rotary valve 15 open into a coarse dosing position, which is just upstream of the maximum open position of the rotary valve 15. The product falls in substantially unimpeded manner into the left-hand pan 7. As soon as the weighing device 8 detects a value dependent on the desired weight and the material to be weighed, the servomotor 19 is so controlled that it moves the rotary valve 15 into the fine dosing position, i.e. partly closes it. In the fine dosing position the leading edge 20 of the sealing plate is again located behind the rear wall (to the right of the rear wall 12 in FIG. 2), whereas the longitudinal edge 23 of the recess 22 is still in front of the rear wall 12 (to the left of rear wall 12 in FIG. 2). Therefore, the product to be weighed can only flow out through the partial shaft and the small opening therefrom formed by the recess 22. As soon as the weighing device 8 detects the desired final value, the rotary valve 15 is completely closed. In order to take into account the fall path of the material the weighing device makes a predictive calculation. If the weighing device 8 then determines that the weight has not yet been reached, then the rotary valve 15 is again briefly opened by an amount smaller than the fine dosing position.

If a large weight of material is required, e.g. more than 3 kg, then the servomotor 19 can completely open the rotary valve beyond the indicated coarse dosing position at the start of the filling process so as to ensure faster filling.

In order to assist the product flow use can be made of the fluidizing device 27 shown in FIG. 2, which contains a connection 28 for a compressed air line and within the apparatus at least one tube 29, which passes in the product flow direction for a limited distance of the upstream part of the rear wall 12. Preferably, several such tubes are distributed over the rear wall 12. At the lower ends of the tubes are formed air exit apertures or nozzles, which ensure that the air jet is directed in the flow direction. For the protection of the device a cover plate 30 can be located within the intake hopper. If necessary, a protective gas, for example a fumigating gas, can be introduced by means of the fluidizing device 27.

FIG. 4 shows a slightly modified embodiment of the apparatus according to FIGS. 1 to 3. In this case, upstream of the front wall 13 there is an additional guide plate 31, which is slightly inclined in the closed or sealed position. It can be constructed in such a way that during the movement of the sealing plate 16 it is at least partly also moved and for this purpose can e.g. be provided as a drag lever, which for reasons of simplification is not shown.

In the embodiment according to FIG. 4, on the inside of the sealing plate 16 of the rotary flap or valve 15, there are individual projections 32, e.g. pins. They are arranged in such a way that they do not impede the movement of the shut-off valve 15, i.e. within the area which is always positioned inside the shaft. These projections can help to break loose any solidified filling material.

According to the invention, a vibrating device can be provided, which can be formed in simple manner in that the servomotor generates short, rapid vibrations of the shut-off valve 15, e.g. when the latter is in the completely closed state.

A typical filling process can e.g. take place in the following way. Firstly the rotary valve 15 is opened to the coarse flow position. During this, both the larger part of the shaft 11 to the right of the partition 25 in FIG. 3 and the smaller shaft part to the left are opened. The actual position of the rotary valve 15 is dependent on the filling quantity and the product.

On reaching the coarse disconnection point, which is established by the weighing device 8, the servomotor 19 returns the rotary valve 15 to the fine flow position. The part of the shaft to the right of the partition 25 is completely closed, whereas the cross-section of the remaining opening is determined by the shape of the recess 22 in the leading edge 20 of the rotary valve 15 and the fine flow position. After reaching the fine disconnection point, the rotary valve 15 is completely closed. All the indicated flap or valve positions can be freely selected. If it is determined during the filling process that there has been a drop below the nominal filling quantity, it is possible to open the rotary valve 15 again to an after-portioning position, which is a random position of the rotary valve 15 between the closed position and the maximum fine flow position.

In the case of filling quantities above a certain weight or volume, e.g. 3 kg, prior to the actual filling process the rotary valve 15 is opened to a pre-portioning position, which is over, that is beyond the coarse flow position. Following an adjustable time, the rotary valve 15 returns to the coarse flow position and the normal filling process follows.

In the case of small volumes or weights, the coarse flow position is below the maximum possible fine flow position. In this case most of the shaft, to the right of the partition 25 in FIG. 3, remains permanently closed. Here again, a fine flow position is possible through the rotation of the rotary valve 15. On closing the rotary valve 15, its leading edge 20 strikes almost at right angles the extension of the rear wall 12. There is no gap between the rotary valve 16 and the rear wall 12. It can occur with coarse-grain material that individual grains will be crushed by the leading edge. In order to avoid such crushing with special products, e.g. seed and grain, according to the invention the lower edge of the rear wall 12 can be given an elastic sealing lip 33 as shown in FIG. 5, whose elasticity can be chosen as a function of the individual circumstances. If, on closing the rotary valve, there is a single grain at the lower edge, it will not be crushed by the rotary valve 15 and will instead be secured by the elastically resilient sealing lip. It is therefore undamaged and is ejected in undamaged form during the next dosing process.

We claim:

1. Apparatus for supplying doses of a free-flowing material measured by at least one of volume and weight, comprising:
   an enclosed shaft having a rear wall, the material to be supplied sliding downwardly over the rear wall;
   one rotary valve for closing the shaft located at a lower end of the shaft and mounted for rotation about an axis located near the rear wall of the shaft; and,
   a motor drive for moving the one rotary valve throughout a range between a maximum open position and a closed position, the one rotary valve being adjustable to any intermediate position in the range, including a coarse flow position and a fine flow position.

2. Apparatus according to claim 1, wherein the shaft comprises a front wall of fixed construction facing the rear wall.

3. Apparatus according to claim 1, wherein one of the intermediate positions of the rotary valve corresponds to an after-dosing position.

4. Apparatus according to claim 1, wherein one of the intermediate positions of the rotary valve corresponds to a pre-portioning position.

5. Apparatus according to claim 1, comprising a fine dosing device.

6. Apparatus according to claim 1, wherein the rotary valve comprises a leading edge having a recess.

7. Apparatus according to claim 6, wherein the recess has a rectangular cross-section.

8. Apparatus according to claim 6, wherein the recess has a cross-sectional shape continuously decreasing from the leading edge.

9. Apparatus according to claim 1, further comprising a partition subdividing the shaft near the rear wall.

10. Apparatus according to claim 9, wherein the rotary valve comprises a leading edge having a recess and the partition extends up from an end of the recess.

11. Apparatus according to claim 9, wherein the shaft comprises a front wall of fixed construction facing the rear wall and the partition extends from the rear wall.

12. Apparatus according to claim 9, wherein the rotary valve comprises a leading edge having a recess and the recess is positioned entirely on one side of the partition.

13. Apparatus according to claim 9, wherein the shaft comprises a front wall of fixed construction facing the rear wall and side walls connecting the front and rear walls, and the length of the recess along the leading edge corresponds to the distance from the partition to one of the side walls of the shaft.

14. Apparatus according to claim 1, further comprising projections positioned on an inside surface of the rotary valve.

15. Apparatus according to claim 1, wherein the servomotor vibrates the rotary valve.

16. Apparatus according to claim 2, further comprising an additional guide plate near the front wall.

17. Apparatus according to claim 1, further comprising an end stop sensor for the rotary valve.

18. Apparatus according to claim 1, further comprising a fluidizing device near the rear wall.

19. Apparatus according to claim 1, wherein the motor drive for the rotary valve comprises a servomotor.

20. Apparatus according to claim 19, wherein the servomotor comprises a stepping motor.

21. Apparatus according to claim 1, wherein the rotary valve can be moved below the rear wall of the shaft.

22. Apparatus according to claim 19, further comprising a device for determining the instantaneous position of the rotary valve.

23. Apparatus according to claim 1, wherein the rear wall has a lower edge comprising an elastic resilient construction.

24. Apparatus according to claim 23, wherein the lower edge of the rear wall comprises a rubber elastic lip.

25. Apparatus according to claim 1, further comprising a device for delivering a clearly defined volume to compensate for bulk density fluctuations.

26. Apparatus according to claim 16, wherein the additional guide plate is movable with the rotary valve.

* * * * *